(12) United States Patent
Luo et al.

(10) Patent No.: US 10,789,456 B2
(45) Date of Patent: Sep. 29, 2020

(54) FACIAL EXPRESSION RECOGNITION UTILIZING UNSUPERVISED LEARNING

(71) Applicant: Adobe Inc., San Jose, CA (US)

(72) Inventors: Yu Luo, State College, PA (US); Xin Lu, Mountain View, CA (US); Jen-Chan Jeff Chien, Saratoga, CA (US)

(73) Assignee: Adobe Inc., San Jose, CA (US)

( * ) Notice: Subject to any disclaimer, the term of this patent is extended or adjusted under 35 U.S.C. 154(b) by 90 days.

(21) Appl. No.: 15/856,271

(22) Filed: Dec. 28, 2017

(65) Prior Publication Data
US 2019/0205625 A1    Jul. 4, 2019

(51) Int. Cl.
*G06K 9/00* (2006.01)
*G06N 3/08* (2006.01)
(Continued)

(52) U.S. Cl.
CPC ..... *G06K 9/00302* (2013.01); *G06K 9/00288* (2013.01); *G06K 9/66* (2013.01); *G06N 3/0454* (2013.01); *G06N 3/088* (2013.01); *G06N 3/0481* (2013.01); *G06N 5/003* (2013.01); *G06N 20/10* (2019.01); *G06N 20/20* (2019.01)

(58) Field of Classification Search
CPC combination set(s) only.
See application file for complete search history.

(56) References Cited

U.S. PATENT DOCUMENTS

| | | | | |
|---|---|---|---|---|
| 9,036,898 B1* | 5/2015 | Beeler | ..................... | G06T 19/20 382/154 |
| 2008/0260212 A1* | 10/2008 | Moskal | ............... | A61B 5/1079 382/118 |

(Continued)

OTHER PUBLICATIONS

Aifanti, N. et al., "The mug facial expression database", 2010, In Image Analysis for Multimedia Interactive Services (WIAMIS), 2010 11th International Workshop on Variable Structure Systems, IEEE, pp. 1-4.

(Continued)

*Primary Examiner* — Zhiyu Lu
(74) *Attorney, Agent, or Firm* — Finch & Maloney PLLC

(57) ABSTRACT

Techniques are disclosed for a facial expression classification. In an embodiment, a multi-class classifier is trained using labelled training images, each training image including a facial expression. The trained classifier is then used to predict expressions for unlabelled video frames, whereby each frame is effectively labelled with a predicted expression. In addition, each predicted expression can be associated with a confidence score. Anchor frames can then be identified in the labelled video frames, based on the confidence scores of those frames (anchor frames are frames having a confidence score above an established threshold). Then, for each labelled video frame between two anchor frames, the predicted expression is refined or otherwise updated using interpolation, thereby providing a set of video frames having calibrated expression labels. These calibrated labelled video frames can then be used to further train the previously trained facial expression classifier, thereby providing a supplementally trained facial expression classifier.

18 Claims, 8 Drawing Sheets

(51) Int. Cl.
*G06K 9/66* (2006.01)
*G06N 3/04* (2006.01)
*G06N 5/00* (2006.01)
*G06N 20/20* (2019.01)
*G06N 20/10* (2019.01)

(56) References Cited

U.S. PATENT DOCUMENTS

| | | | | |
|---|---|---|---|---|
| 2011/0200270 | A1* | 8/2011 | Kameyama | G06T 1/00 382/260 |
| 2015/0363634 | A1* | 12/2015 | Yin | G06K 9/00221 382/118 |
| 2017/0300741 | A1* | 10/2017 | Seuss | G06K 9/00228 |
| 2017/0319123 | A1* | 11/2017 | Voss | A61B 5/165 |
| 2017/0351905 | A1* | 12/2017 | Wang | G06K 9/00308 |
| 2018/0033190 | A1* | 2/2018 | Ma | G06T 15/503 |

OTHER PUBLICATIONS

Lucey, P. et al., "The Extended Cohn-Kanade Dataset (CK+): A complete dataset for action unit and emotion-specified expression", 2010, At IEEE Computer Society Conference, In Computer Vision and Pattern Recognition Workshops (CVPRW), 17 pages.

Goeleven, E. et al., "The Karolinska Directed Emotional Faces: A validation study", 2008, Cognition and Emotion, vol. 22, pp. 1094-1118.

* cited by examiner

FACIAL EXPRESSION RECOGNITION UTILIZING UNSUPERVISED LEARNING

FIELD OF THE DISCLOSURE

This disclosure relates generally to digital image processing, and more particularly, to expression recognition using unsupervised learning.

BACKGROUND

Consumer electronic devices, such as laptop computers, tablet computers, and smartphones, are increasingly being used to share media. For example, increasing numbers of applications are being offered on these devices that allow the users to capture, send, receive, and process digital media, including digital photographs, videos, and movies. Moreover, recognition and classification of expressions on the faces of people captured in the images is finding increasing use in many of these applications. For instance, facial expression recognition and classification can be used in providing cues that support verbal communication, behavioral science and clinical applications, natural human-machine interfaces, and virtual reality applications, to name a few examples. Recent advances in facial expression classification methods are built on standard facial expression datasets that include posed and induced facial expression images typically captured in a controlled laboratory environment with high resolution and no occlusions. As a consequence of relying on such relatively pristine standard facial expression datasets, existing facial expression classification methods generally suffer from a relatively high-level of unreliability, particularly with respect to discriminating subtle facial expressions.

As will be appreciated in light of this disclosure, the above-noted reliability problem associated with facial expression classification largely stems from the manner in which standard machine learning systems operate when performing the task of facial expression classification. In particular, conventional techniques treat facial expression classification as a single image classification task, and utilize a corresponding metric, such as accuracy, for evaluation of the predicted expression for a given image. Unfortunately, facial expression classification is not necessarily a singular or otherwise simple classification task. In many cases, for instance, a person's face may seemingly convey multiple expressions at the same time, such as "happily surprised" and "sadly surprised". Moreover, the transition from one expression (e.g., neutral facial expression) to the next (e.g., happy facial expression) is typically a gradual change in terms of time. In any case, given the dynamic complexity of facial expressions, the corresponding predictions output by a typical facial expression classifier system can suffer from jitter (abrupt or otherwise false fleeting changes in predicted expression) during a given input image sequence. In particular, each image frame of the input sequence causes a facial expression prediction to be output, and because of perceived changes in the frame-to-frame facial expression, the predictions can effectively jump from one facial expression type (e.g., happy) to another facial expression type (e.g., surprised) and then back to the previous facial expression (e.g., happy). This relatively abrupt expression change from one frame to the next or so-called jitter is generally atypical or otherwise not representative of natural changes in human facial expressions, which generally occur in a subtler fashion over a relatively large set of frames (not counting the special case where the subject is actually trying to abruptly change facial expressions). To this end, there are a number of non-trivial issues associated with facial expression classification.

BRIEF DESCRIPTION OF THE DRAWINGS

The accompanying drawings are not intended to be drawn to scale. In the drawings, each identical or nearly identical component that is illustrated in various figures is represented by a like numeral, as will be appreciated when read in context.

Figure 1A:
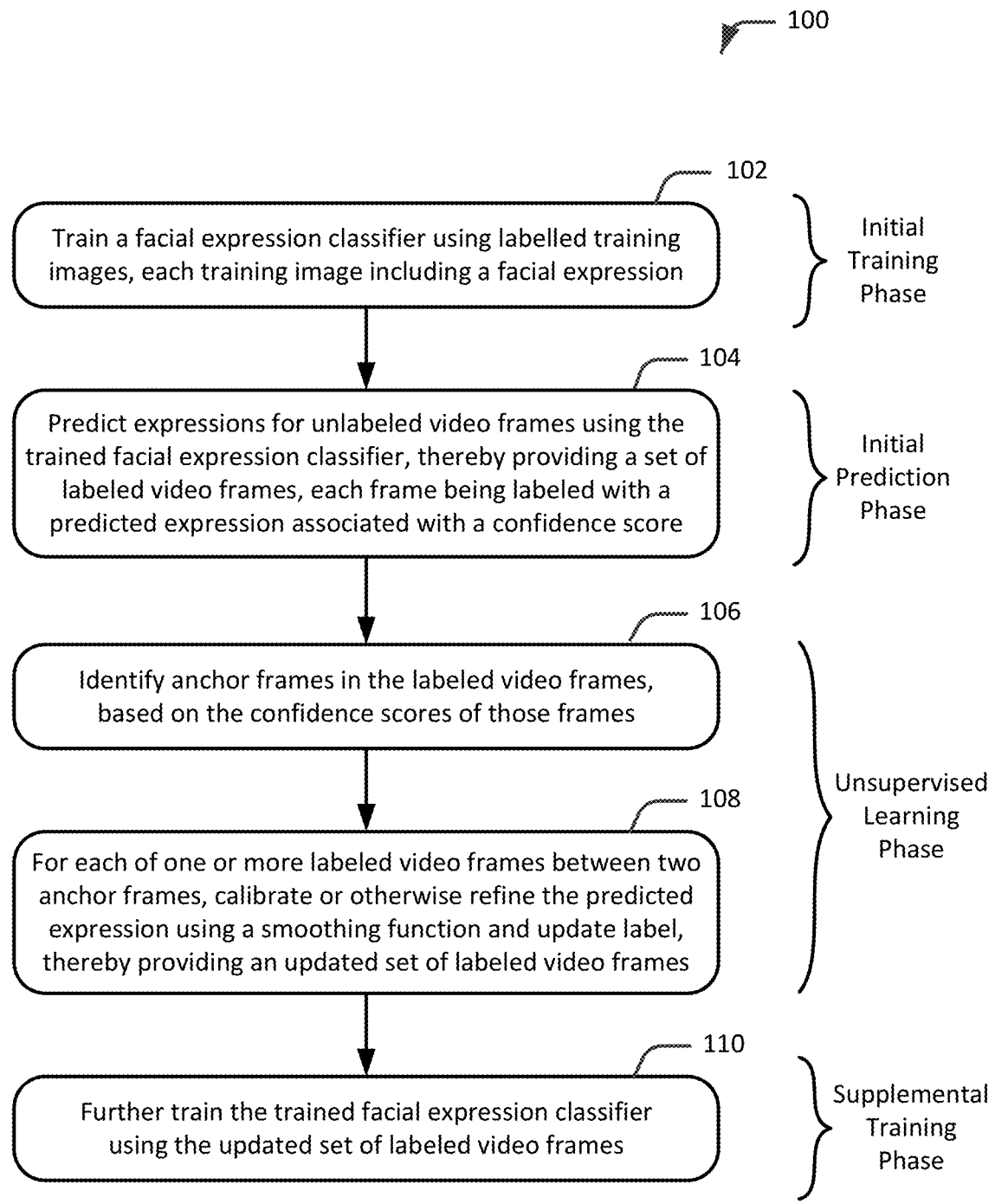
FIG. 1a is a flow diagram illustrating an example process to supplementally or otherwise further train a previously trained facial expression classifier, in accordance with at least some embodiments described herein.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

DETAILED DESCRIPTION

Techniques are disclosed for a facial expression classification. In an embodiment, a facial expression classifier is trained using labelled training images, each training image including a facial expression. The trained classifier is then used to predict expressions for unlabelled video frames, whereby each frame is effectively labelled with a predicted expression. In addition, each predicted expression is associated with a confidence score (e.g., indicative of accuracy of predicted expression). Anchor frames can then be identified in the labelled video frames, based on the confidence scores of those frames, wherein anchor frames are frames have a confidence score above an established threshold. Then, for each labelled video frame between two anchor frames, the predicted expression is refined or otherwise updated using interpolation, thereby providing an updated set of labelled video frames. The updated set of labelled video frames can then be used to further train the previously trained facial expression classifier, thereby providing a supplementally trained facial expression classifier.

General Overview

As previously explained, there are a number of non-trivial issues associated with facial expression classification. For instance, typical facial expression classifiers suffer from abrupt or otherwise false fleeting changes in predicted expression, or so-called jitter, during a given input image sequence. Because such relatively abrupt expression changes from one frame to the next or so-are generally not representative of natural changes in human facial expressions, improved facial expression classification techniques are needed. To this end, the techniques provided herein are particularly well-suited to eliminate or otherwise reduce the occurrence of jitter or false fleeting predictions output by a given facial expression classifier when processing an input of video frames.

In an example embodiment of the present disclosure, a facial expression classifier is trained using labelled training images, each training image including a facial expression. Because this training is carried out using labelled images, it is generally referred to herein as a supervised machine learning process. The trained classifier is then used to predict expressions for unlabelled video frames, whereby each frame is effectively labelled with a predicted expression. In addition, each predicted expression is associated with a confidence score. In some such embodiments, for instance, the confidence score is a measure of the likelihood that the facial expression prediction for that frame is correct, although other confidence measures can be used as will be appreciated.

In any case, anchor frames can then be identified in the labelled video frames, based on the confidence scores of those frames. So, for instance, frames having a confidence score above a given threshold can be identified as anchor frames. Because of their high confidence score, such anchor frames are not subjected to further prediction refinement. The frames between anchor frames, however, may actually have an incorrect expression and therefore are subjected to further processing. In more detail, for each labelled video frame between two anchor frames, the predicted expression (as indicated by the label) is calibrated or otherwise refined using a smoothing function (e.g., sigmoid function) or other interpolation process. Executing the interpolation process relative to the anchor frames ensures a smooth transition from one facial expression prediction to the next, as will be appreciated in light of this disclosure. The video frame labels are then updated accordingly, thereby providing an updated set of labelled video frames. Because this prediction refinement process can be carried out without regard to the corresponding frame label given by the initial prediction phase, it is referred to herein as an unsupervised machine learning process.

The updated set of labelled video frames can then be used to further train the previously trained facial expression classifier, thereby providing a supplementally trained facial expression classifier. As will be appreciated, this supplemental training effectively sensitizes the classifier to the subtler changes in facial expression that may occur between high confidence facial expressions. As such, the occurrence of jitter in the predictions output by that classifier are reduced or eliminated.

Various embodiments of the classification framework provide for recognition and verification of facial expressions of faces captured in digital images (interchangeably referred to herein as "images" or "frames"). In some embodiments, the framework includes an initial training phase, an initial prediction phase, an unsupervised learning phase, and a supplemental training phase. As will be appreciated, these phases are used for purposes of facilitating discussion and should not be construed as structural or otherwise rigid limitations. For instance, the initial prediction phase and unsupervised learning phase may be combined into a single phase between the initial and supplement training phases, wherein that single phase receives unlabelled video frames as input data and outputs facial expression predictions generated using unsupervised learning. In short, any number of phases can be used to provide the various functionality provided herein. Moreover, note that the term "initial" is not intended to be limited to the first training or an otherwise absolute numbered training session; rather, an initial training phase is simply relative to a later-performed supplemental training phase. Numerous embodiments will be apparent.

In the initial training phase, a facial expression classifier is trained using a supervised learning model to predict a facial expression. The training is conducted with images having known (labelled) facial expressions, and hence is referred to as being supervised. Once trained, the facial expression classifier can then be used to predict facial expression for unlabelled video frames during the initial prediction phase. As a result of this initial prediction phase, each frame is labelled with a predicted expression. Each predicted expression is associated with a confidence score. The labelled video frames output by the initial prediction phase provide the input to the unsupervised learning phase. The unsupervised learning phase calibrates, updates, or otherwise refines the labels of video frames having relatively low confidence predictions, thereby providing an updated set of labelled video frames. In the supplemental training phase, the previously trained facial expression classifier is further trained using the updated set of labelled video frames.

The facial expression classifier may be implemented, for example, using any suitable machine learning system, algorithm or mechanism capable of being trained to solve multi-class classification problems (e.g., capable of learning facial expression (class) specific probability), such as random forests, neural networks (e.g., convolutional neural networks), gradient boosted trees, support vector machines (SVMs), and decision trees, to name a few examples. In some specific embodiments, the facial expression classifier is implemented using a convolutional neural network.

In one example embodiment, the well-defined training samples used to initially train the classifier in the initial training phase are comprised of posed and/or induced facial expression images (e.g., which can be represented as vectors) and corresponding labels (e.g., respective corresponding signals), where each label indicates the facial expression captured in the respective image. In one example case, the facial expression images may be captured in a controlled laboratory environment, and annotators may provide the labels for the images. Additionally or alternatively, images containing or depicting faces may be obtained from any commercial or publicly available sources, and the facial expressions conveyed in the images may be labelled by annotators. In still other embodiments, pre-labelled facial expression images can be acquired from a given source. In such cases, the digital images files may be encoded with the label and confidence score, for example, according to a specification provided to the source by the acquiring party.

In any such cases, the initially trained facial expression classifier effectively provides a baseline model trained for facial expression classification, and can be used to predict facial expressions for unlabelled video frames. Videos that contain people's faces are provided as a set of input video frames to the trained classifier, which in turn predicts a facial expression for each frame. The content of the video will vary from one use case to the next, as will be appreciated. In some example cases, the video frames may include posed facial expressions of people. Additionally or alternatively, the video frames may be arbitrary videos that contain images of people's faces in a natural setting. In a more general sense, the videos can be any video having one or more frames that include one or more facial expressions. In any such cases, the videos generally capture the gradual changes in emotions of the subjects in terms of time, including the subtle changes in facial expressions. In any case, during the initial prediction phase, the trained classifier automatically labels the facial expressions for the unlabelled video frames applied to the classifier input.

In the unsupervised learning phase, the predictions resulting from the initial prediction phase are effectively checked and refined as needed, to reduce or eliminate jitter. In some such embodiments, for instance, an expression calibration engine is provided to calibrate (correct, refine, or otherwise update) the initially predicted facial expressions by interpolating the emotion distribution (e.g., distribution of facial expressions) between each pair of anchor frames. For example, the emotion distribution may be interpolated using a sigmoid function, although other smoothing functions may be used.

In some such embodiments, the expression calibration engine interpolates the emotion distribution between two anchor frames only if a separation between the anchor frames satisfies a separation threshold. For example, if the anchor frames are separated by less than 30 or 60 frames (or some other amount of frames or other suitable threshold), the expression calibration engine may interpolate the emotion distribution between such anchor frames. Alternatively, if the anchor frames are separated by more than 60 frames (or some other amount of frames or other suitable threshold), the expression calibration engine may not interpolate the emotion distribution between such anchor frames. To this end, a reasonable inference that can be made by the expression calibration engine is that interpolation of the emotion distribution between anchor frames that are temporally too far apart may result in a poor or inaccurate interpolation of the emotion distribution. In these instances, the initially predicted facial expressions for the video frames may be maintained, according to some embodiments. As noted, the separation threshold may specify a number of frames, which equates to an approximate duration of time based on the frame rate of the video. The separation threshold may be preconfigured or otherwise set, for example, by a provider of the framework or a user of the framework. Additionally or alternatively, the separation threshold may be a tunable parameter. For example, the separation threshold may be specified in a configuration file that is accessible by the expression calibration engine, and a user (or system administrator) may tune or adjust the separation threshold based on the performance of the framework. For example, a user can tune the separation threshold to achieve a desired performance of the framework and, in particular, the expression calibration engine.

In the supplemental training phase, the previously trained facial expression classifier is further or supplementally trained using the labelled frames generated or otherwise updated by the unsupervised learning phase. In one such embodiment, predictions output by the unsupervised learning phase may include predictions for one or more frames between the anchor frames that didn't meet the separation threshold (and therefore the initial prediction resulting from the unsupervised learning phase or some other default prediction is used), as well as predictions for one or more frames between the anchor frames that did meet the separation threshold (and therefore the updated prediction resulting from the unsupervised learning phase is used). In any such cases, the supplementally trained classifier is effectively able to leverage the temporal smoothness of facial expressions in the labelled frames generated by the unsupervised learning phase, and is able to better classify the facial expressions, including the subtle facial expressions, of faces captured in images.

In some embodiments, each input sample used to supplementally train the trained facial expression classifier is comprised of two video frames of the automatically labelled video, and respective corresponding ground truths. That is, each training sample is comprised of two automatically labelled video frames. The two automatically labelled video frames in each training sample are similar in terms of the emotion distribution in that the two video frames convey a similar facial expression. Once trained, the supplementally trained facial expression classifier is able to predict with relatively high confidence, for two input image frames, a similarity of the facial expressions conveyed in those two frames. To this end, the supplementally trained facial expression classifier is able to verify the similarity of facial expressions for those two input images.

In some embodiments, the framework includes an expression verification engine configured to verify the similarity of facial expressions for two images based on respective feature vectors. A feature vector that represents a predicted facial expression of an image may be provided by or extracted from the supplementally trained facial expression classifier. In an example use case and embodiment, the supplementally trained classifier is able to generate, for an input image, a feature vector that represents a predicted facial expression for the input image. The expression verification engine is configured to receive as input two feature vectors, and compare those two feature vectors to verify the similarity of facial expressions respectively represented by the two feature vectors. For example, the feature vectors may be compared using a suitable similarity measure, such as Euclidean distance and cosine similarity, to name two examples.

Turning now to the figures, FIG. 1a is a flow diagram illustrating an example process 100 to supplementally or otherwise further train a previously trained facial expression classifier, in accordance with at least some embodiments described herein. Example processes and methods may include one or more operations, functions or actions as illustrated by one or more of blocks 102, 104, 106, 108, and/or 110, and may in some embodiments be performed by a computing system such as a computing system 700 of FIG. 7. The operations described in blocks 102-110 may also be stored as computer-executable instructions in a computer-readable medium, such as a memory 704 and/or a data storage 706 of computing system 700, or some other non-transitory machine readable medium. The process may be performed by components of a facial expression classification and verification framework.

As will be further appreciated in light of this disclosure, for this and other processes and methods disclosed herein, the functions performed in the processes and methods may be implemented in differing order. Additionally or alternatively, two or more operations may be performed at the same time or otherwise in an overlapping contemporaneous fashion. Furthermore, the outlined actions and operations are only provided as examples, and some of the actions and operations may be optional, combined into fewer actions and operations, or expanded into additional actions and operations without detracting from the essence of the disclosed embodiments.

As depicted by the flow diagram illustrated in FIG. 1a, the process 100 includes an initial training phase, an initial prediction phase, an unsupervised learning phase, and a supplemental training phase. In more detail, and as can be seen at block 102, the initial training phase includes training a facial expression classifier using labelled training images as training samples. Each training sample may include, for example, an image having a person's face captured therein, and a label indicating a facial expression conveyed by the face captured in the corresponding image. An expression may, for instance, be happy, sad, neutral, surprised, angry, disgusted, or scared, to name a few example expressions. Note that the training images may also include non-face images or so-called negative samples, so as to complement the positive images including facial expressions, according to some embodiments. Once trained using the initial training set, the trained classifier is able to predict a facial expression for the face captured in an input image. In some embodiments, the initially trained classifier may also generate a confidence score, which is an indication of a probability that the predicted facial expression for the face captured in the image is correct.

As will be appreciated, the robustness of training set used to train the classifier in the initial training phase can vary from one embodiment to the next. In any case, the trained classifier can be used to label one or more frames of video, the video frames containing images of various facial expressions. The captured facial expressions will typically gradually change as the video progresses. For example, videos are commonly captured at frame rates (e.g., 25, 30, and 60 frames per second) that produce neighboring or successive video frames that are commonly pixel-wise very similar and, thus, able to capture subtle differences in facial expressions. Unlike the labelled images that comprise the training set used during the initial training phase, the videos exhibit a temporal smoothness across the changes in emotions and expressions. Moreover, there are a large number of videos, including videos of images of very large numbers of different faces and facial expressions, readily available for processing via the trained classifier. So, the initially labelled videos generated by trained classifier during the initial prediction phase (as will be discussed in turn), whose labels may further be calibrated or otherwise refined during the subsequent unsupervised learning phase (as will be discussed in turn), are used to supplementally or further train the classifier (during the supplemental training phase) to more accurately predict facial expressions, including subtle facial expressions, of faces captured in images.

With further reference to the example embodiment of FIG. 1, the method 100 continues at block 104 with the initial prediction phase, where the trained classifier is used to predict facial expressions for unlabelled video data. The video data may include video frames of one or more videos, where at least some of the video frames include an image having a person's face captured therein. One or more of these videos may be input to the trained classifier, and the classifier can predict the facial expressions for the captured faces. In addition to predicting the facial expressions for the faces captured in the video frames, the trained classifier automatically labels the unlabelled video frames accordingly. As can be further seen in the example embodiment, the classifier may also generate a confidence score with each facial expression prediction. In some embodiments, the faces captured in the video frames may be cropped, for example, to accentuate the faces, prior to being input to the trained facial expression classifier. For example, any suitable image editing application may be used to crop the faces captured in the video frames.

The process 100 continues at 106, where the unsupervised learning phase begins. Here, anchor frames in the labelled video data generated by the initial prediction phase are identified. As previously explained, the anchor frames are the video frames for which the trained classifier predicted facial expressions with a high degree of confidence. In videos that capture people's facial expressions, certain facial expressions are readily recognizable. For example, changes in facial expressions from one expression to another expression (e.g., from "happy" to "sad", from "sad" to "surprised, from "disgusted" to "scared", etc.) in the videos are readily recognizable. As such, for these video frames having a recognizable change in facial expression from a preceding video frame, it may be the case that the initially trained multi-class classifier is able to make a high confidence prediction of the facial expressions. That is, the initially trained multi-class classifier is able to predict with a higher degree of confidence the facial expressions captured in the video frames having a recognizable change in facial expression than the facial expressions captured in the video frames not having a recognizable change (e.g., a subtle or slight change) in facial expression. Accordingly, the video frames having a recognizable change in facial expression from a preceding video frame are likely to be identified as anchor frames. In still other embodiments, an input video frame having a facial expression that has a high degree of correlation with a facial expression in a given training set can be identified as an anchor frame. For instance, a frame having a facial expression that has three or more key points or features of correlation on a total correlation having five key points/features (i.e., a correlation of 60% or higher) can be designated as an anchor frame in some embodiments. In other such embodiments, a frame having a facial expression that has a key feature correlation of 80% or higher can be designated as an anchor frame. Any number of suitable confidence metrics can be used. In any such embodiments, the video frames having respective confidence scores that satisfy a confidence threshold are identified as anchor frames.

The unsupervised learning phase continues at 108, where the facial expressions predicted for the video frames between the anchor frames are calibrated or updated as needed, using an unsupervised learning process. For example, the predicted facial expressions for the video frames not identified as anchor frames are calibrated by interpolating the emotion distribution (e.g., distribution of facial expressions) between each pair of anchor frames. In some embodiments, the emotion distribution may be interpolated using a sigmoid function or some other smoothing function. In some embodiments, the emotion distribution between a pair of anchor frames is interpolated (e.g., calibrated) if the pair of anchor frames are close in terms of time, for example, as specified by a separation threshold. For example, if the pair of anchor frames is separated by less than the separation threshold, the emotion distribution between such pair of anchor frames is interpolated. Alternatively, if the pair of anchor frames is separated by at least the separation threshold, the emotion distribution between such pair of anchor frames is not interpolated, and the facial expressions predicted by the trained classifier (during the initial prediction phase) for the video frames between such pair of anchor frames are maintained. The separation threshold may specify a number of frames, such as 23 frames, 25 frames, 27 frames, to name a few examples, which equate to approximate durations of time based on the frame rate of the video. For example, a separation threshold of 25 frames may equate to approximately 1 second of the video. The automatically labelled videos, including the facial expressions predicted for the anchor frames (during the initial prediction phase) and the facial expressions predicted for frames between the anchor frames (during the unsupervised learning phase), comprise a supplemental training set. Accordingly, the supplemental training set may be comprehensive in that the automatically labelled videos, including the labelled video frames, better captures the full spectrum of possible facial expressions as compared to the initial training set. In some example embodiments, the video frames and/or the facial expressions predicted for the video frames may be fine-tuned using a using a suitable loss function, such as Kullback-Leibler Divergence (KL divergence) and cross entropy loss, to name two examples.

In the supplemental training phase at 110, the trained classifier is further or supplementally trained using the supplemental training set (generated at the unsupervised learning phase) comprised of the automatically labelled video or videos as training samples. Each training sample may include a video frame of the automatically labelled video, and a label indicating the facial expression for the video frame, for example, the facial expression conveyed by the face captured in the video frame. As discussed above, the facial expression may be the facial expression predicted by the classifier during the initial training phase, for example, in the case of anchor frames, or the calibrated facial expression predicted during the unsupervised learning phase, for example, in the instance of video frames not identified to be anchor frames. Once the trained classifier is supplementally or otherwise further trained using the supplemental training set, the supplementally trained facial expression classifier is able to predict with a relatively higher degree of confidence, a facial expression including subtle facial expressions of a face captured in an input image. In addition, given other images having a similar facial expression captured therein, the supplementally trained classifier is further able to consistently predict those subtle facial expressions.

In some embodiments, additional or alternative operations may be performed. For example, in some embodiments, the trained facial expression classifier is supplementally trained using training samples, where each training sample is comprised of two video frames of the automatically labelled video, and respective labels indicating the facial expression for each of the two video frames. The two video frames in each training sample are similar in terms of the emotion distribution in that the predicted facial expression for each of the two video frames is similar, and in some cases the same. That is, the two video frames in a training sample have respective labels that indicate the same facial expression. Once the trained classifier is supplementally (further) trained in this manner, the classifier is able to predict, provided two images each having a face captured therein, a similarity of the facial expressions of the faces captured in the respective two images, with high confidence.

Figure 1B:
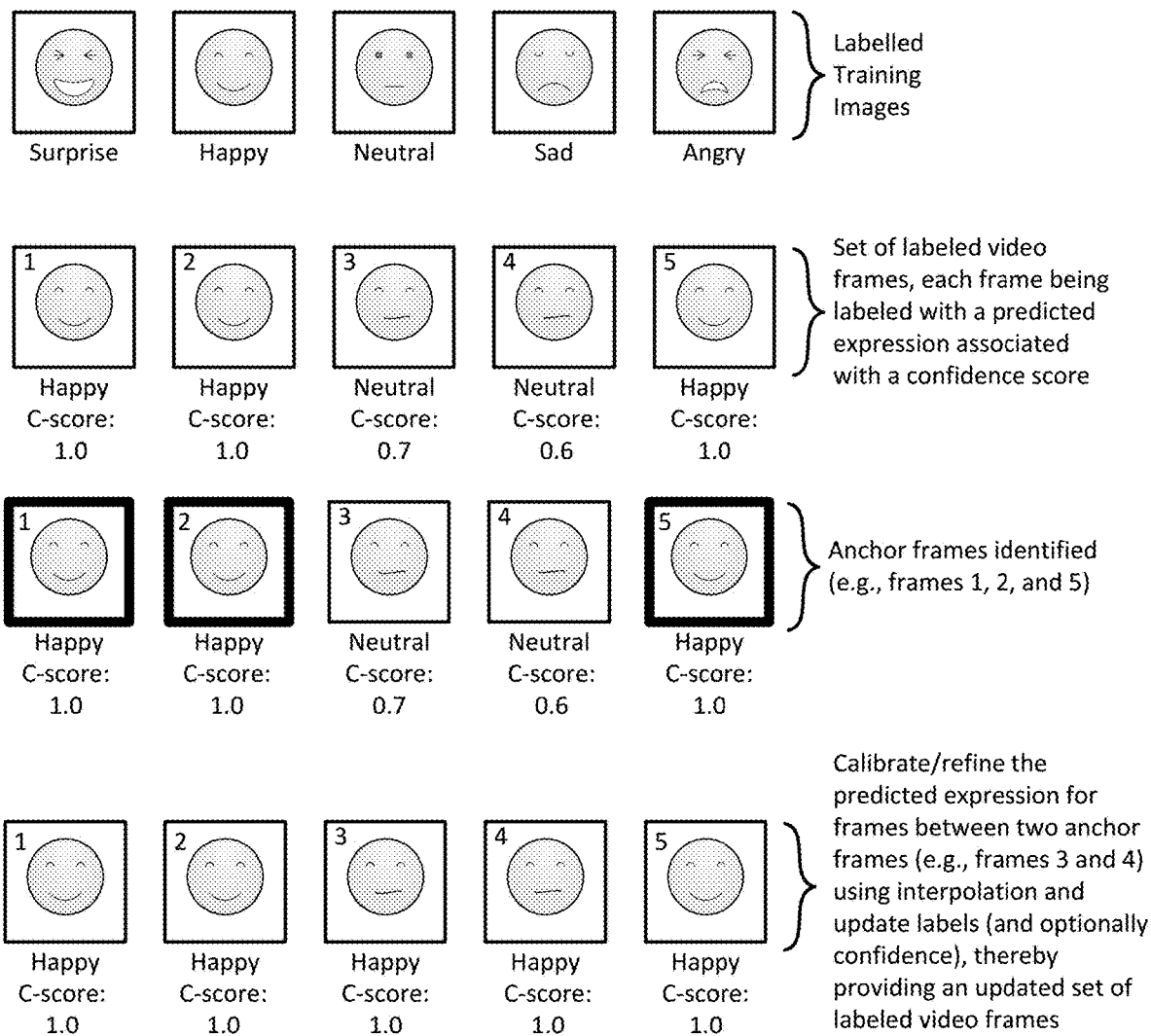
FIG. 1b illustrates an example set of training images (first/top line) for training a facial expression classifier, along with an example set of input video frames (second line) that are processed according to the process of FIG. 1a to identify anchor frames (third line) and produce an updated set of labelled video frames (fourth line) that can be used to supplementally train the facial expression classifier, in accordance with at least some embodiments described herein.

FIG. 1*b* illustrates an example use case, according to the methodology shown in FIG. 1*a*. The top line represents a set of labelled training images for training a facial expression classifier in the initial training phase of FIG. 1*a*. As can be seen, this example training set includes many common facial expressions, including surprise, happy, neutral, sad, and angry facial expressions. The second line of images represent an example set of input video frames that have been processed through the initial prediction phase of FIG. 1*a*. As a result of that initial prediction phase processing, each frame is labelled or otherwise associated with a predicted facial expression. In addition, each frame is associated with a confidence score (C-score).

The third line of images represents the identification of anchor frames during the unsupervised learning phase of FIG. 1*a*. As can be seen, frames 1, 2, and 5 received a label of "happy" along with a confidence score of 1.0. Assume the threshold confidence score for identifying anchor frames is 0.8, so frames 1, 2, and 5 are accordingly identified as anchor frames (as generally depicted via a bold black border). In contrast, frames 3 and 4 each received a label of "neutral" along with relatively low confidence scores (0.7 and 0.6, respectively). Thus, frames 3 and 4 are not designated as anchor frames. There are no intervening frames between frames 1 and 2, so there are no frames to process in that regard. However, frames 3 and 4 are between anchor frames 2 and 5 and may therefore be available for label refinement. Thus, assuming the separation threshold is met (if applicable), frames 3 and 4 are subjected to an unsupervised learning process to calibrate or otherwise refine the predicted "neutral" expression using a smoothing function. Because the smoothing function knows the beginning expression ("happy" at frame 2) and the concluding expression ("happy" at frame 5), the intervening expressions of frames 3 and 4 can be interpolated. So, the prediction labels from frames 3 and 4 can be updated accordingly, based on that interpolation process, thereby providing an updated set of labelled video frames, as shown in the last line of images of FIG. 1*b*. Note how the updated set of labelled video frames are free of prediction jitter and have relatively high confidence scores. This updated set of labelled video frames can be used to supplementally train the facial expression classifier, in accordance with at least some embodiments described herein.

Figure 2:
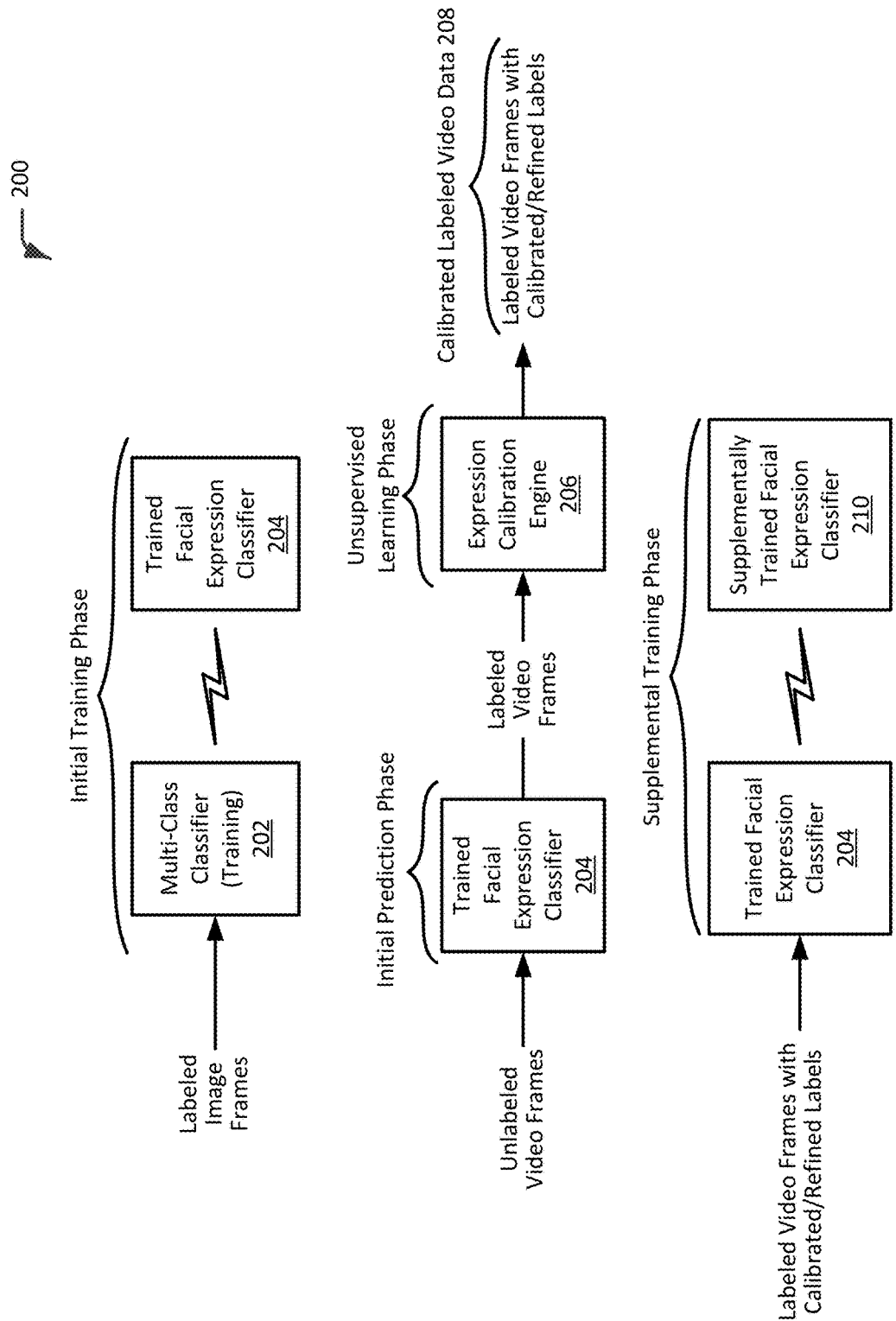
FIG. 2 is a diagram illustrating an example generation of a supplementally trained facial expression classifier, in accordance with at least some embodiments described herein.

FIG. 2 is a diagram 200 illustrating an example generation of a supplementally trained facial expression classifier 210, in accordance with at least some embodiments described herein. As shown in diagram 200, a multi-class classifier 202 is trained as a facial expression classifier using a training set that includes labelled images to generate a trained facial expression classifier 204. At least some of the labelled images in the training set of the initial training phase are an image including a person's face, and the label is indicative of the facial expression of the face captured in the image. The trained classifier 204 is able to predict, for an unlabelled input image, a facial expression for the image. So, during the initial prediction phase, unlabelled video data (in the form of video frames in this example embodiment) is provided as input to the trained classifier 204, which automatically labels the unlabelled video data to generate labelled video data. As can be further seen in this example embodiment, the unlabelled video data may be video frames, where each video frame includes an image of a person's face. The generated labelled video data may include labels for each of the video frames of the video data, where each label indicates a facial expression for a respective video frame as predicted by trained classifier 204 during the initial prediction phase.

As can be further seen in the example embodiment of FIG. 2, the labelled video data is provided or otherwise made available to an expression calibration engine 206, during the unsupervised learning phase. Expression calibration engine 206 is configured to identify anchor frames in the labelled video data, and calibrate the predicted expressions for the video frames between each pair of anchor frames to generate a calibrated labelled video data 208, which in this example case include labelled video frames having calibrated (updated or otherwise refined) labels (for one or more of the frames). In some embodiments, calibrated labelled video data 208 includes a pair of anchor frames and one or more intervening frames having updated/refined labels. As will be appreciated, calibrated labelled video data 208 may effectively be used as a supplemental training set.

In more detail, and with reference to the supplemental training phase of FIG. 2, the trained classifier 204 is further trained using calibrated labelled video data 208 to generate supplementally trained classifier 210. For example, and as depicted in FIG. 2, each training sample of 208 used to supplementally train classifier 204 includes a video frame that includes an image of a person's face, and a label that indicates the facial expression of the face captured in the image. Trained in this manner, classifier 210 is able to predict, for an input image, a facial expression for the image.

Figure 3:
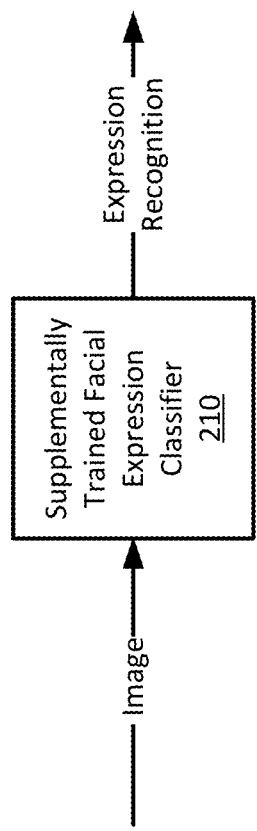
FIG. 3 is a diagram illustrating an example facial expression recognition by the supplementally trained facial expression classifier of FIG. 2, in accordance with at least some embodiments described herein.

FIG. 3 is a diagram 300 illustrating an example facial expression recognition by supplementally trained classifier 210 of FIG. 2, in accordance with at least some embodiments described herein. As shown in diagram 300, supplementally trained facial expression classifier 210 is able to predict, provided an image of a face captured therein, a facial expression of the face captured in the image. Being supplementally trained using the supplemental training set 208, the supplementally trained classifier 210 is able to predict even subtle facial expressions, according to some embodiments.

Figure 4:
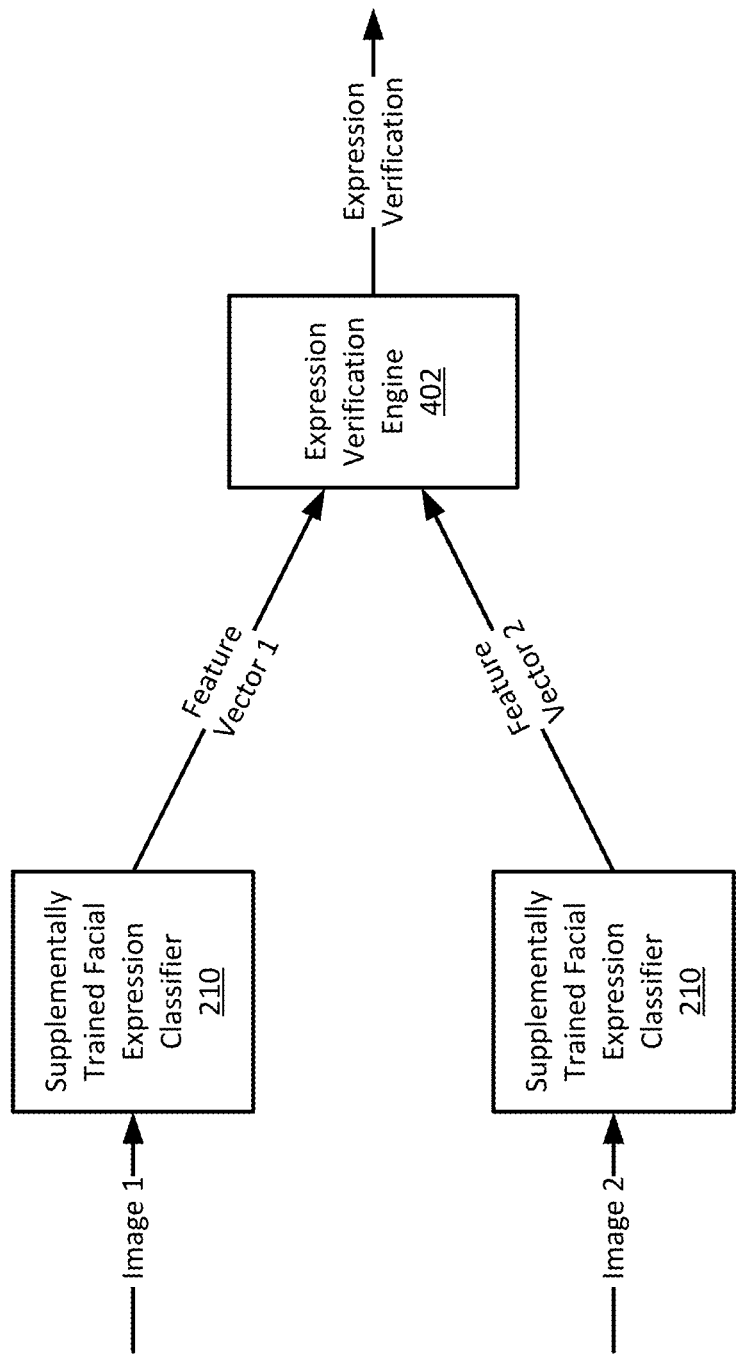
FIG. 4 is a diagram illustrating an example facial expression verification by an expression verification engine, in accordance with at least some embodiments described herein.

FIG. 4 is a diagram 400 illustrating an example facial expression verification by an expression verification engine 402, in accordance with at least some embodiments described herein. As shown in diagram 400, expression verification engine 402 is configured to, provided two feature vectors, each feature vector representing a respective facial expression, verify the similarity of the facial expressions represented by the two feature vectors. Supplementally trained facial expression classifier 210 is able to generate, provided an image of a face captured therein, a feature vector that represents a facial expression predicted for the face captured in the image. To verify the similarity of two facial expressions captured in two images, each image may be provided or otherwise made available to a respective supplementally trained classifier 210, which generates a feature vector representing a facial expression predicted for the face captured in the provided image. In other cases, the two images may be sequentially provided, one image at a time, to supplementally trained classifier 210, which likewise sequentially generates two feature vectors, one feature vector at a time. The two feature vectors generated using supplementally trained classifier 210 can then be provided or otherwise made available to expression verification engine 402 for verification of the similarity of the two facial expressions, for example, the two predicted facial expressions, respectively represented by the two feature vectors. In some embodiments, expression verification engine 402 may verify the similarity of two facial expressions by comparing the two feature vectors representing the two facial expressions using a suitable similarity measure, such as Euclidean distance and cosine similarity, to name a few examples.

Figure 5:
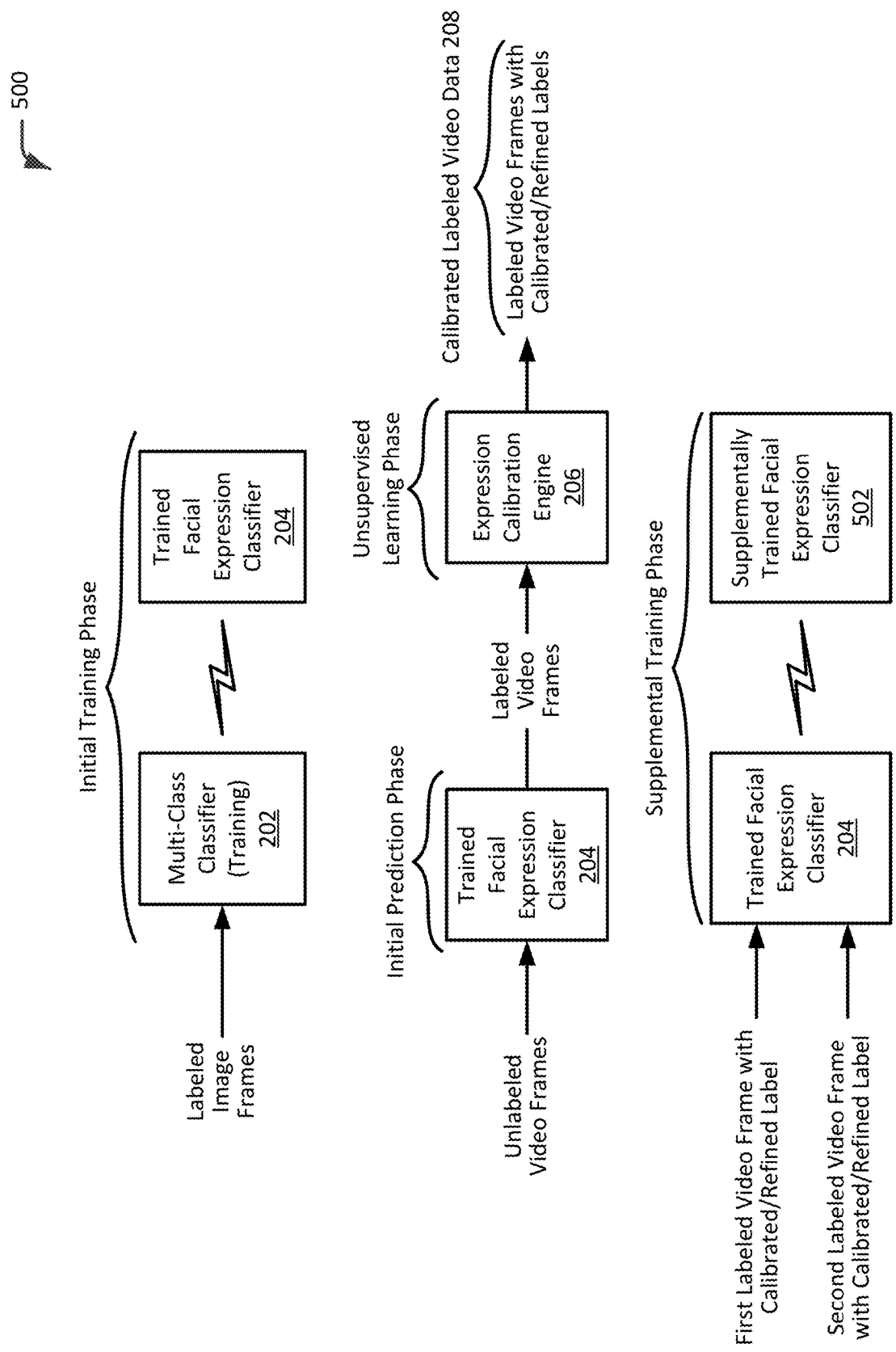
FIG. 5 is a diagram illustrating an example generation of another supplementally trained facial expression classifier, in accordance with at least some embodiments described herein.

FIG. 5 is a diagram 500 illustrating an example generation of another supplementally trained facial expression classifier 502, in accordance with at least some embodiments described herein. Diagram 500 of FIG. 5 is similar to diagram 200 of FIG. 2, with additional details. The previously relevant discussion is equally applicable here. As shown in diagram 500, classifier 204 is supplementally trained using calibrated labelled video data 208 to generate supplementally trained classifier 502. For example, and as depicted in FIG. 5, each training sample (in 208) used to train classifier 204 during the supplemental training phase includes a pair of labelled video frames, where each labelled video frame includes an image of a person's face, and respective labels indicating the facial expression for each of the pair of video frames. Trained in this manner, supplementally trained classifier 502 is able to predict, for two input images, a similarity of the facial expressions conveyed in the input two images. That is, supplementally trained classifier 502 is able to verify the similarity of facial expressions for two input images.

Figure 6:
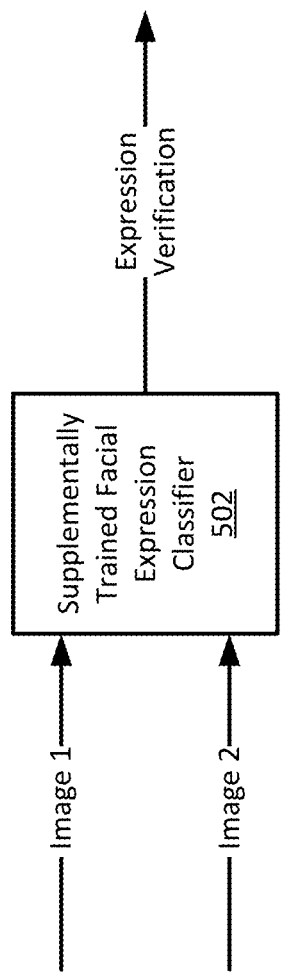
FIG. 6 is a diagram illustrating an example facial expression verification by the supplementally trained facial expression classifier of FIG. 5, in accordance with at least some embodiments described herein.

FIG. 6 is a diagram 600 illustrating an example facial expression verification by supplementally trained facial expression classifier 502 of FIG. 5, in accordance with at least some embodiments described herein. As shown in diagram 600, supplementally trained classifier 502 is able to predict, provided two images, each image of a face captured therein, a similarity of the facial expressions of the two faces respectfully captured in the two images. Being trained using the supplemental training set, classifier 502 is able to verify the similarity of even subtle facial expressions, according to some embodiments.

Figure 7:
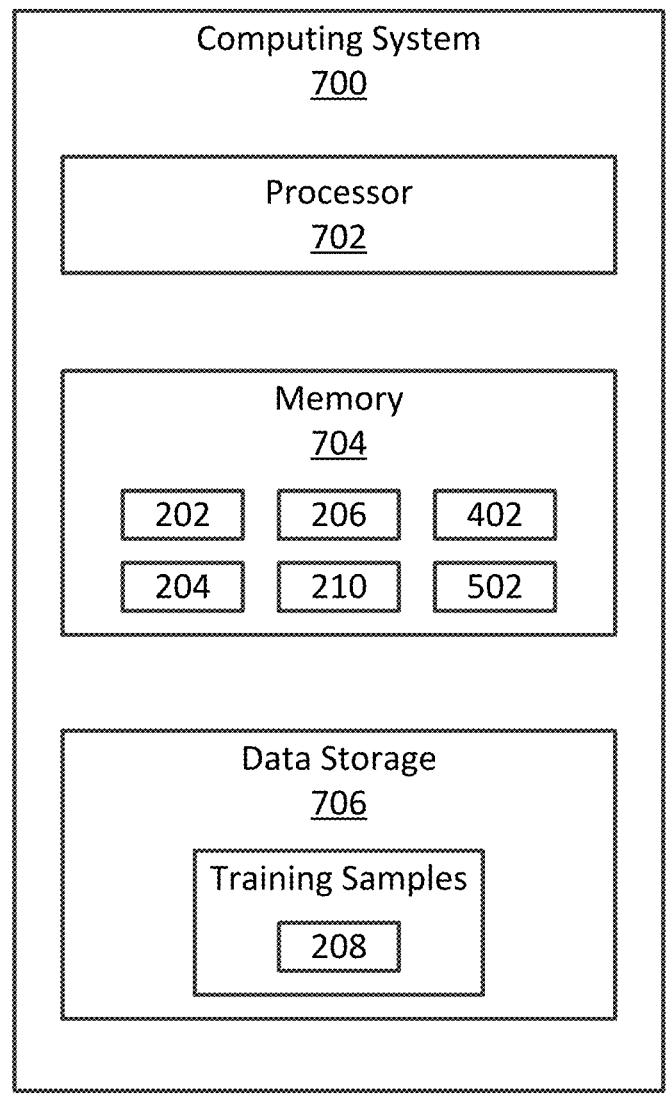
FIG. 7 illustrates selected components of an example computing system that may be used to perform any of the techniques as variously described in the present disclosure, in accordance with at least some embodiments described herein.

FIG. 7 illustrates selected components of example computing system 700 that may be used to perform any of the techniques as variously described in the present disclosure, in accordance with at least some embodiments described herein. In some embodiments, computing system 700 may be configured to implement or direct one or more operations associated with some or all of the engines, components and/or modules associated with the facial expression classification and verification framework. For example, multi-class classifier 202, trained facial expression classifier 204, expression calibration engine 206, training samples including calibrated labelled video data 208, supplementally trained facial expression classifier 210, expression verification engine 402, supplementally trained facial expression classifier 502, or any combination of these may be implemented in and/or using computing system 700. In one example case, for instance, each of 202, 204, 206, 210, 402, and 502 is loaded in memory 704 and executable by a processor 702, and training samples including calibrated labelled video data 208 is included in data storage 706. Computing system 700 may be any computer system, such as a workstation, desktop computer, server, laptop, handheld computer, tablet computer, mobile computing or communication device, or other form of computing or telecommunications device that is capable of communication and that has sufficient processor power and memory capacity to perform the operations described in this disclosure. A distributed computational system may be provided that includes a multiple of such computing devices. As depicted, computing system 700 may include processor 702, memory 704, and data storage 706. Processor 702, memory 704, and data storage 706 may be communicatively coupled.

In general, processor 702 may include any suitable special-purpose or general-purpose computer, computing entity, or computing or processing device including various computer hardware, firmware, or software modules, and may be configured to execute instructions, such as program instructions, stored on any applicable computer-readable storage media. For example, processor 702 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 7, processor 702 may include any number of processors and/or processor cores configured to, individually or collectively, perform or direct performance of any number of operations described in the present disclosure. Additionally, one or more of the processors may be present on one or more different electronic devices, such as different servers.

In some embodiments, processor 702 may be configured to interpret and/or execute program instructions and/or process data stored in memory 704, data storage 706, or memory 704 and data storage 706. In some embodiments, processor 702 may fetch program instructions from data storage 706 and load the program instructions in memory 704. After the program instructions are loaded into memory 704, processor 702 may execute the program instructions.

For example, in some embodiments, any one or more of the engines, components and/or modules of the facial expression classification and verification framework may be included in data storage 706 as program instructions. Processor 702 may fetch some or all of the program instructions from data storage 706 and may load the fetched program instructions in memory 704. Subsequent to loading the program instructions into memory 704, processor 702 may execute the program instructions such that the computing system may implement the operations as directed by the instructions.

In some embodiments, virtualization may be employed in computing device 700 so that infrastructure and resources in computing device 700 may be shared dynamically. For example, a virtual machine may be provided to handle a process running on multiple processors so that the process appears to be using only one computing resource rather than multiple computing resources. Multiple virtual machines may also be used with one processor.

Memory 704 and data storage 706 may include computer-readable storage media for carrying or having computer-executable instructions or data structures stored thereon. Such computer-readable storage media may include any available media that may be accessed by a general-purpose or special-purpose computer, such as processor 702. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause processor 702 to perform a certain operation or group of operations.

Modifications, additions, or omissions may be made to computing system 700 without departing from the scope of the present disclosure. For example, in some embodiments, computing system 700 may include any number of other components that may not be explicitly illustrated or described herein.

As indicated above, the embodiments described in the present disclosure may include the use of a special purpose or a general-purpose computer (e.g., processor 702 of FIG. 7) including various computer hardware or software modules, as discussed in greater detail herein. As will be appreciated, once a general-purpose computer is programmed or otherwise configured to carry out functionality according to an embodiment of the present disclosure, that general purpose computer becomes a special purpose computer. Further, as indicated above, embodiments described in the present disclosure may be implemented using computer-readable media (e.g., memory 704 of FIG. 7) for carrying or having computer-executable instructions or data structures stored thereon.

Additional Example Embodiments

Numerous example embodiments will be apparent in light of this disclosure. A number of such examples are provided here. In addition, numerous permutations and combinations of elements and/or functionalities will be further apparent.

Example 1 is a computer-implemented method for classifying a facial expression captured in an image frame, the method comprising: predicting, by a trained classifier, a facial expression for each video frame of a plurality of video frames; identifying one or more pairs of anchor frames included in the plurality of video frames, based on the predicted facial expression for each video frame; for each pair of anchor frames, calibrating the predicted facial expression for one or more video frames that are between the pair of anchor frames, thereby generating a set of video frames having calibrated expression labels; and predicting, by the trained classifier after having been supplementally trained using the set of video frames having calibrated expression labels, a facial expression for an input image.

Example 2 includes the subject matter of Example 1, wherein the trained classifier is initially trained using a plurality of labelled images.

Example 3 includes the subject matter of Example 1 or 2, wherein the trained classifier is a neural network.

Example 4 includes the subject matter of any of Examples 1 through 3, wherein each anchor frame is identified based on the predicted facial expression of that frame satisfying a confidence threshold.

Example 5 includes the subject matter of any of Examples 1 through 5, wherein calibrating the predicted facial expression for one or more video frames that are between the pair of anchor frames comprises an interpolation process.

Example 6 includes the subject matter of Example 5, wherein the interpolation process is based on a sigmoid function.

Example 7 includes the subject matter of any of Examples 1 through 6, wherein the input image is a first input image, and the method further includes: generating, by the trained classifier after having been supplementally trained using the set of video frames having calibrated expression labels, a first feature vector associated with the first input image, the first feature vector being representative of the facial expression for the first input image; generating, by the trained classifier after having been supplementally trained using the set of video frames having calibrated expression labels, a second feature vector associated with a second input image, the second feature vector being representative of a facial expression for the second input image; and predicting a similarity of the facial expression for the first input image and the facial expression for the second input image.

Example 8 includes the subject matter of any of Examples 1 through 7, wherein the input image is a first input image, and the method further includes predicting, by the trained classifier after having been supplementally trained using the set of video frames having calibrated expression labels, a similarity of the facial expression for the first input image and a facial expression for a second input image. In some such cases, note that the trained classifier can be supplementally trained using the set of video frames having calibrated expression labels, wherein each training sample includes the two video frames. The two video frames can be similar in terms of facial expression captured therein, as previously explained.

Example 9 is a computer program product including one or more non-transitory machine-readable mediums encoded with instructions that when executed by one or more processors cause a process to be carried out to provide facial expression classification. The process includes: predicting, by a trained classifier, a facial expression for each video frame of a plurality of video frames; identifying one or more pairs of anchor frames included in the plurality of video frames, based on the predicted facial expression for each video frame; for each pair of anchor frames, calibrating the predicted facial expression for one or more video frames that are between the pair of anchor frames, thereby generating a set of video frames having calibrated expression labels; and predicting, by the trained classifier after having been supplementally trained using the set of video frames having calibrated expression labels, a facial expression for an input image.

Example 10 includes the subject matter of Example 9, wherein the trained classifier is initially trained using a plurality of labelled images.

Example 11 includes the subject matter of Example 9 or 10, wherein the trained classifier is a neural network.

Example 12 includes the subject matter of any of Examples 9 through 11, wherein each anchor frame is identified based on the predicted facial expression of that frame satisfying a confidence threshold.

Example 13 includes the subject matter of any of Examples 9 through 12, wherein calibrating the predicted facial expression for one or more video frames that are between the pair of anchor frames comprises an interpolation process.

Example 14 includes the subject matter of Example 13, wherein the interpolation process is based on a sigmoid function.

Example 15 includes the subject matter of any of Examples 9 through 14, wherein the input image is a first input image, the method further including: generating, by the trained classifier after having been supplementally trained using the set of video frames having calibrated expression labels, a first feature vector associated with the first input image, the first feature vector being representative of the facial expression for the first input image; generating, by the trained classifier after having been supplementally trained using the set of video frames having calibrated expression labels, a second feature vector associated with a second input image, the second feature vector being representative of a facial expression for the second input image; and predicting a similarity of the facial expression for the first input image and the facial expression for the second input image.

Example 16 includes the subject matter of any of Examples 9 through 15, wherein the input image is a first input image, the method further including: predicting, by the trained classifier after having been supplementally trained using the set of video frames having calibrated expression labels, a similarity of the facial expression for the first input image and a facial expression for a second input image.

Example 17 includes the subject matter of any of Examples 9 through 16, wherein one or more training samples used to supplementally train the trained classifier include two video frames and associated facial expression labels.

Example 18 includes a system for providing facial expression classification, the system comprising: one or more electronic memories encoding instructions; and one or more processors configured to execute the instructions to carry out a process that includes predict, by a trained classifier, a facial expression for each video frame of a plurality of video frames; identify one or more pairs of anchor frames included in the plurality of video frames, based on the predicted facial expression for each video frame; for each pair of anchor frames, calibrate via an interpolation process the predicted facial expression for one or more video frames that are between the pair of anchor frames, thereby generating a set of video frames having calibrated expression labels; and predict, by the trained classifier after having been supplementally trained using the set of video frames having calibrated expression labels, a facial expression for an input image.

Example 19 includes the subject matter of Example 18, wherein the trained classifier is a neural network.

Example 20 includes the subject matter of Example 18 or 19, wherein each anchor frame is identified based on the predicted facial expression of that frame satisfying a confidence threshold.

As used in the present disclosure, the terms "engine" or "module" or "component" may refer to specific hardware implementations configured to perform the actions of the engine or module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations, firmware implements, or any combination thereof are also possible and contemplated. In this description, a "computing entity" may be any computing system as previously described in the present disclosure, or any module or combination of modulates executing on a computing system.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure. Accordingly, it is intended that the scope of the present disclosure be limited not by this detailed description, but rather by the claims appended hereto.

What is claimed is:

1. A computer-implemented method for classifying a facial expression captured in an image frame, the method comprising:
   predicting, by a trained classifier, a facial expression for each video frame of a plurality of video frames;
   identifying one or more pairs of anchor frames included in the plurality of video frames, based on the predicted facial expression for each video frame;
   for a particular pair of anchor frames, determining a distribution of predicted facial expressions between the particular pair of anchor frames;
   for the particular pair of anchor frames, calibrating the predicted facial expression for one or more video frames that are between the particular pair of anchor frames by interpolating between the predicted facial expressions for the particular pair of anchor frames, thereby generating a set of video frames having calibrated expression labels; and
   predicting, by the trained classifier after having been supplementally trained using the set of video frames having calibrated expression labels, a facial expression for an input image.

2. The method of claim 1, wherein the trained classifier is initially trained using a plurality of labelled images.

3. The method of claim 1, wherein the trained classifier is a neural network.

4. The method of claim 1, wherein each anchor frame is identified based on the predicted facial expression of that frame satisfying a confidence threshold.

5. The method of claim 1, wherein interpolating between the predicted facial expressions for the particular pair of anchor frames further comprises using a sigmoid function.

6. The method of claim 1, wherein the input image is a first input image, the method further comprising:
   generating, by the trained classifier after having been supplementally trained using the set of video frames having calibrated expression labels, a first feature vector associated with the first input image, the first feature vector being representative of the facial expression for the first input image;
   generating, by the trained classifier after having been supplementally trained using the set of video frames having calibrated expression labels, a second feature vector associated with a second input image, the second feature vector being representative of a facial expression for the second input image; and
   predicting a similarity of the facial expression for the first input image and the facial expression for the second input image.

7. The method of claim 1, wherein the input image is a first input image, the method further comprising: predicting, by the trained classifier after having been supplementally trained using the set of video frames having calibrated expression labels, a similarity of the facial expression for the first input image and a facial expression for a second input image.

8. A computer program product including one or more non-transitory machine-readable mediums encoded with instructions that when executed by one or more processors cause a process to be carried out to provide facial expression classification, the process comprising:
   predicting, by a trained classifier, a facial expression and a confidence level for a plurality of video frames;
   identifying a pair of anchor frames included in the plurality of video frames, wherein each of the anchor frames has a confidence level that exceeds a threshold confidence level, and wherein each frame between the anchor frames has a confidence level that does not exceed the threshold confidence level;
   making a determination that the identified pair of anchor frames are separated by a quantity of frames that is less than a separation threshold;
   in response to making the determination, calibrating the predicted facial expression for one or more video frames between the anchor frames, thereby generating a set of video frames having calibrated expression labels; and
   predicting, by the trained classifier after having been supplementally trained using the set of video frames having calibrated expression labels, a facial expression for an input image.

9. The computer program product of claim 8, wherein the trained classifier is initially trained using a plurality of labelled images.

10. The computer program product of claim 8, wherein the trained classifier is a neural network.

11. The computer program product of claim 8, wherein calibrating the predicted facial expression for the one or more video frames between the anchor frames comprises an interpolation process.

12. The computer program product of claim 11, wherein the interpolation process is based on a sigmoid function.

13. The computer program product of claim 8, wherein the input image is a first input image, the process further comprising:
    generating, by the trained classifier after having been supplementally trained using the set of video frames having calibrated expression labels, a first feature vector associated with the first input image, the first feature vector being representative of the facial expression for the first input image;
    generating, by the trained classifier after having been supplementally trained using the set of video frames having calibrated expression labels, a second feature vector associated with a second input image, the second feature vector being representative of a facial expression for the second input image; and
    predicting a similarity of the facial expression for the first input image and the facial expression for the second input image.

14. The computer program product of claim 8, wherein the input image is a first input image, the process further comprising: predicting, by the trained classifier after having been supplementally trained using the set of video frames having calibrated expression labels, a similarity of the facial expression for the first input image and a facial expression for a second input image.

15. The computer program product of claim 8, wherein one or more training samples used to supplementally train the trained classifier include two video frames and associated facial expression labels.

16. A system for providing facial expression classification, the system comprising:
    one or more electronic memories encoding instructions; and
    one or more processors configured to execute the instructions to carry out a process that includes
        predict, by a trained classifier, a facial expression for a plurality of video frames;
        identify a pair of anchor frames included in the plurality of video frames, based on the predicted facial expression for the anchor frames;
        determine a distribution of predicted facial expressions between the anchor frames;
        calibrate the predicted facial expression for at least a portion of the video frames that are between the anchor frames by interpolating between the predicted facial expressions for the pair of anchor frames, thereby generating a set of video frames having calibrated expression labels; and
        predict, by the trained classifier after having been supplementally trained using the set of video frames having calibrated expression labels, a facial expression for an input image.

17. The system of claim 16, wherein the trained classifier is a neural network.

18. The system of claim 16, wherein each anchor frame is identified based on the predicted facial expression of that frame satisfying a confidence threshold.

* * * * *